United States Patent [19]

Jones et al.

[11] Patent Number: 4,573,898
[45] Date of Patent: Mar. 4, 1986

[54] POSITIVE PRESSURE DOUGH DIVIDER

[75] Inventors: Donald A. Jones, Mornington; Gerhard F. Wawra, Vermont South; William R. Moss, Wantirna, all of Australia

[73] Assignee: Baker Perkins, Pty., Ltd., Victoria, Australia

[21] Appl. No.: 638,482
[22] PCT Filed: Sep. 27, 1983
[86] PCT No.: PCT/AU83/00133
 § 371 Date: Aug. 3, 1984
 § 102(e) Date: Aug. 3, 1984
[87] PCT Pub. No.: WO84/02633
 PCT Pub. Date: Jul. 19, 1984

[30] Foreign Application Priority Data
 Jan. 4, 1983 [AU] Australia ............... PF7487

[51] Int. Cl.⁴ .............................................. A21C 5/04
[52] U.S. Cl. ................... 425/145; 425/239; 425/241; 426/503
[58] Field of Search ............... 425/140, 145, 149, 238, 425/239, 79, 241, 98, 363, 169, 170, 194, 328, 240; 264/40.3, 40.7, 175; 222/52, 55, 63; 426/231, 503, 512, 504

[56] References Cited
U.S. PATENT DOCUMENTS

| 2,922,189 | 1/1960 | Perks ............... 425/363 |
| 3,773,448 | 11/1973 | Poot ............... 425/241 |
| 3,901,635 | 8/1975 | Greenberger ............... 425/145 |
| 3,970,418 | 7/1976 | Turek ............... 425/140 |
| 4,262,024 | 4/1981 | Mathason ............... 426/233 |
| 4,338,341 | 7/1982 | Glass ............... 425/241 |
| 4,503,995 | 3/1985 | Anderson ............... 425/241 |

FOREIGN PATENT DOCUMENTS 765184 8/1971 France ............... 425/140

Primary Examiner—Jay H. Woo
Assistant Examiner—J. Fortenberry
Attorney, Agent, or Firm—Kerkam, Stowell, Kondracki & Clarke

[57] ABSTRACT

A positive pressure dough divider comprising a hopper (14) for dough, and a pair of rotatable sheeting rolls (15) which carry the dough from said hopper (14) into a transfer passage (16) leading to a volumetric measuring chamber (28) inside a rotating body (27) which is adapted to stop or rotate for periods at reduced speed, such that, while the measuring chamber (28) is being charged with dough from the said rolls (15), a maximum possible charging time is provided, and to move at greater speeds at other times to provide minimum possible delay between charging operations. The rolls (15) are of sufficiently large diameter, and rotate in opposite directions at such a speed, as to produce or maintain a dough of good gas retaining properties while providing a positive pressure rise along the direction of flow in the passage between the rolls sufficient to charge the measuring chamber or chambers.

9 Claims, 2 Drawing Figures

POSITIVE PRESSURE DOUGH DIVIDER

TECHNICAL FIELD

This invention relates to a positive pressure dough divider for use in the bread making industry, and more particularly a dough divider designed to accurately scale or divide out quantities of dough for baking into individual loaves of bread.

BACKGROUND ART

In conventional dividers, a reciprocating knife and ram acting like a large pump slides back and forth in a dough box. The dough box is fed from an overhead hopper and is connected to either a reciprocating, or a rotating or oscillating, division box. In operation the flow of dough under the force of gravity into the dough box is assisted by the suction created as the knife and ram slide backwards to uncover the transfer passage from the hopper and the dough is then forced into the division box by the ram as it moves forward with the knife, which leads the ram, such as to move through the dough stream in the transfer passage to separate and seal the dough in the dough box from the dough in the transfer passage from the hopper, and is followed by the ram which forces the dough into the division box.

The accuracy of such conventional types of dough dividers is greatly dependant on maintaining small clearances between the knife, ram and dough box, in order to obtain sufficient suction to draw the required amount of dough into the dough box. The clearances should be sufficient to allow for free relative movement between the parts, but not enough to allow the ingress of air. However, as the machine wears, the clearances increase allowing for the ingress of air and a decrease in the scaling or dividing accuracy, and because of the relatively strict regulations controlling the weight of bread, the divider is no longer commercially acceptable and the dividing head must be replaced or reconditioned or some form of compensation made by the baker. Commonly edible oil is applied to the clearances to restrict air ingress but such application of oil is of reducing effectiveness as wear increases.

It is known in order to overcome the above problem that positive pressure dividers in which continuously running disced rollers at the base of the hopper serve to draw dough from the hopper and positively force it through the transfer passage into the dough box thus avoiding the necessity for dough to be drawn or sucked into the dough box with the attendant possibility of ingress of air as with the conventional dividers referred to above. Furthermore, normal wear with a positive pressure type divider has little or no effect on the scaling or dividing accuracy. The positive pressure is imparted to the dough by means of the continuous running disc rollers by the viscous shearing forces originating on the enlarged surface of the rollers provided by the presence of the discs. The severe working of the dough by these disc rollers, also involves a cutting and tearing action which, when combined with the rather tortuous route from the feed rolls to the division box in a positive pressure divider, can be disadvantageous, in that, although a uniformly scaled product can be produced, the resulting damage to the dough structure seriously reduces the gas retaining properties of the dough and the volume of the resulting loaves after baking and hence their acceptability.

Many alternative methods of providing positive pressure have been attempted, such as the use of positive displacement pumps of varying types, but all have involved severe working and/or tearing of the dough which has in turn resulted in unsatisfactory bread being produced.

It has been determined (see article entitled "Dough Development for Shorter Bread Making Processes" by K. H. Tipples and R. H. Kilborn, October 1974 Edition of the Bakers' Digest) that working or extending of dough between rolls (called sheeting rolls) can be very effective in achieving dough development in the formation of a two dimensional highly oriented dough structure capable of a high degree of gas retention and from which bread of optimum loaf quality and volume may be obtained. The action of the rolls is to produce gentle viscous shearing within the dough mass. We have found that, if a pair of such sheeting rolls is used to impart pressure on a dough mass such that the shearing stresses created by the increasing pressure gradient are not excessive when compared with the gentle shearing stresses imposed by the extending action of the sheeting rolls, then positive pressure may be obtained without the dough damage created by disc feed rolls or other positive pumping means. Such a condition is obtained by using rolls of large diameter. With large diameter rolls the surface area in the vicinity of the narrow passage between adjacent rolls is proportionally increased and the shearing forces necessary to resist the reverse dough flow down the pressure gradient are spread over a larger area resulting in reduced shearing stresses within the dough mass and the substantial elimination of dough damage and its deleterious effect on gas retention.

DISCLOSURE OF THE INVENTION

Therefore, in accordance with the present invention, the above objective is achieved by utilizing large feed rolls which feed dough directly to a measuring chamber.

The present invention therefore envisages a positive pressure dough divider comprising a dough supply and a pair of rotatable sheeting rolls which carry the dough from said supply into a transfer passage leading to one or more volumetric measuring chambers, wherein said rolls are of sufficiently large diameter, and rotate in opposite directions at such a speed, as to produce or maintain a dough of good gas retaining properties while providing a positive pressure rise along the direction of flow in the passage between the rolls sufficient to charge the measuring chamber or chambers.

The invention results in a divider of improved accuracy and consistency of scaling while permitting the production of high quality bread.

Preferably the measuring chamber is adapted to stop whilst being charged with dough from the said rolls to provide maximum possible charging time and to move at relatively fast speeds at other times to provide minimum possible delay between charging operations. One method of approximately this is to provide a rotatable measuring chamber arranged to rotate at a non uniform speed to provide dwell during charging and the minimum time between successive charging operations.

To achieve accurate scaling, it is required to exert pressure on the dough to cause it to completely fill the volume of the measuring chamber. The required pressure can be minimised by reducing the resistance to flow in the passage between the feed rolls and the measuring chamber by making such passage as short as possible and accordingly the invention includes a short straight transfer passage between feed rolls and measuring cylinder.

The pressure required is also dependant on the viscosity of the dough with the required pressure increasing in proportion to the viscosity. As the positive pressure created by the feed rolls also increases in proportion to the viscosity, automatic provision is made for viscosity variation within the dough. In order to provide for a minimum of excess work on the dough it is a requirement that the feed rolls should only pressurise the dough to the extent required and a feature of the invention is that feed rolls speeds be controlled to provide a predetermined pressure in the measuring chamber. Such control requires provision for detection of dough pressure and means whereby feed roll speed may be regulated to achieve the predetermined dough pressure.

As the positive pressure is created by viscous drag forces between the sheeting rolls and the dough, increasing pressure is associated with increasing torque on the drives for the sheeting rolls. Accordingly, the pressure of dough can be controlled by predetermining the torque on the sheeting rolls and the present invention provides for this.

The preset torque drive of the sheeting rolls provides for increasing roll speed during the free charging of the measuring chamber and automatic reduction of feed roll speeds when charging has been achieved and during the time between two charging operations. The consequent reduction of feed roll speeds during the non charging portion of the cycle combined with the reduced period of the cycle between successive charging periods resulting from the variable speed of the drive of the rotatable measuring chamber reduces excess work exerted on the dough.

BRIEF DESCRIPTION OF THE DRAWINGS

One preferred embodiment of the invention will now be described with reference to the accompanying drawings, in which.

BEST MODE FOR CARRYING OUT THE INVENTION

Figure 1:
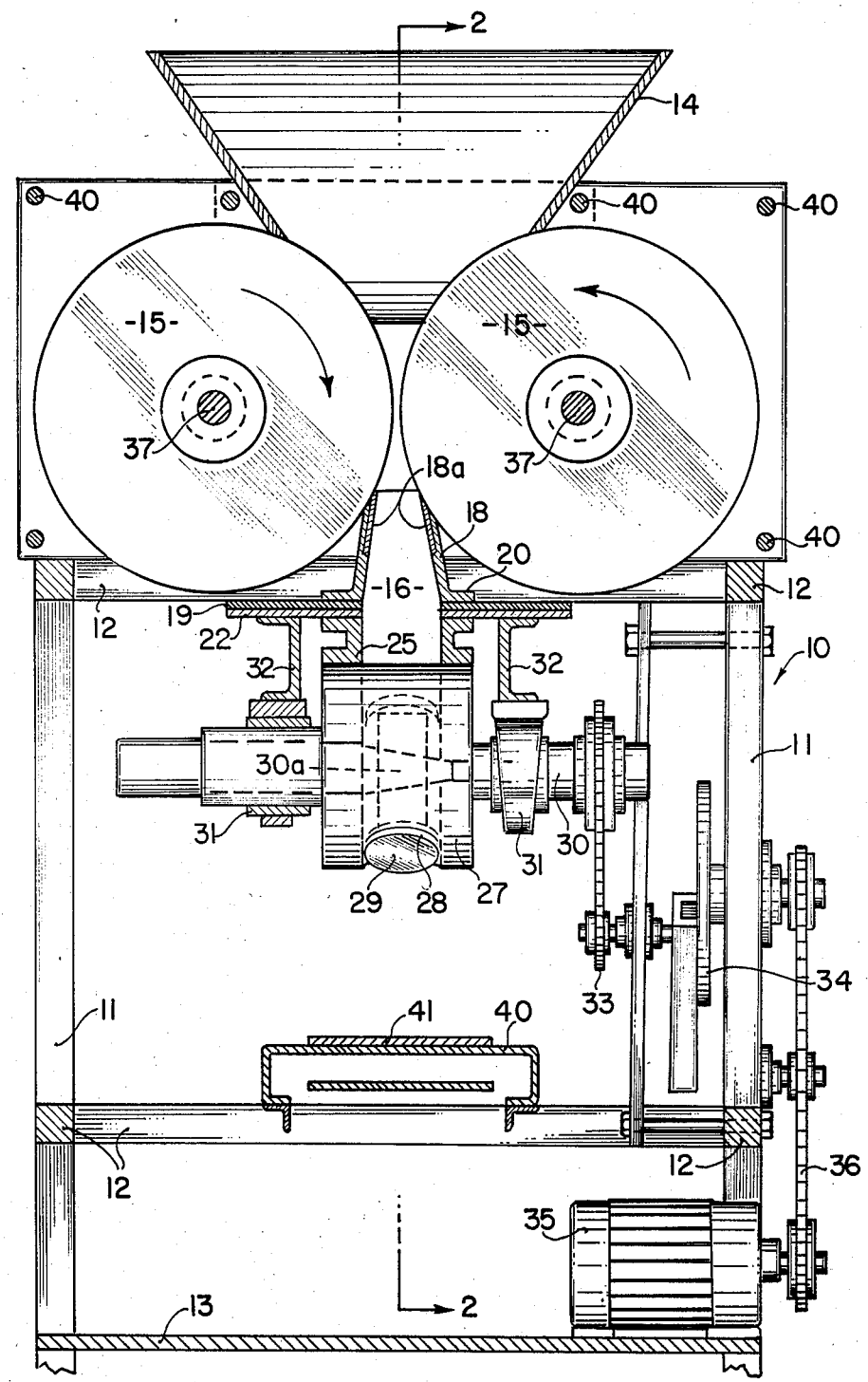
FIG. 1 is an end elevational view, partly sectioned, of the positive pressure dough divider incorporating the present invention.
Figure 2:
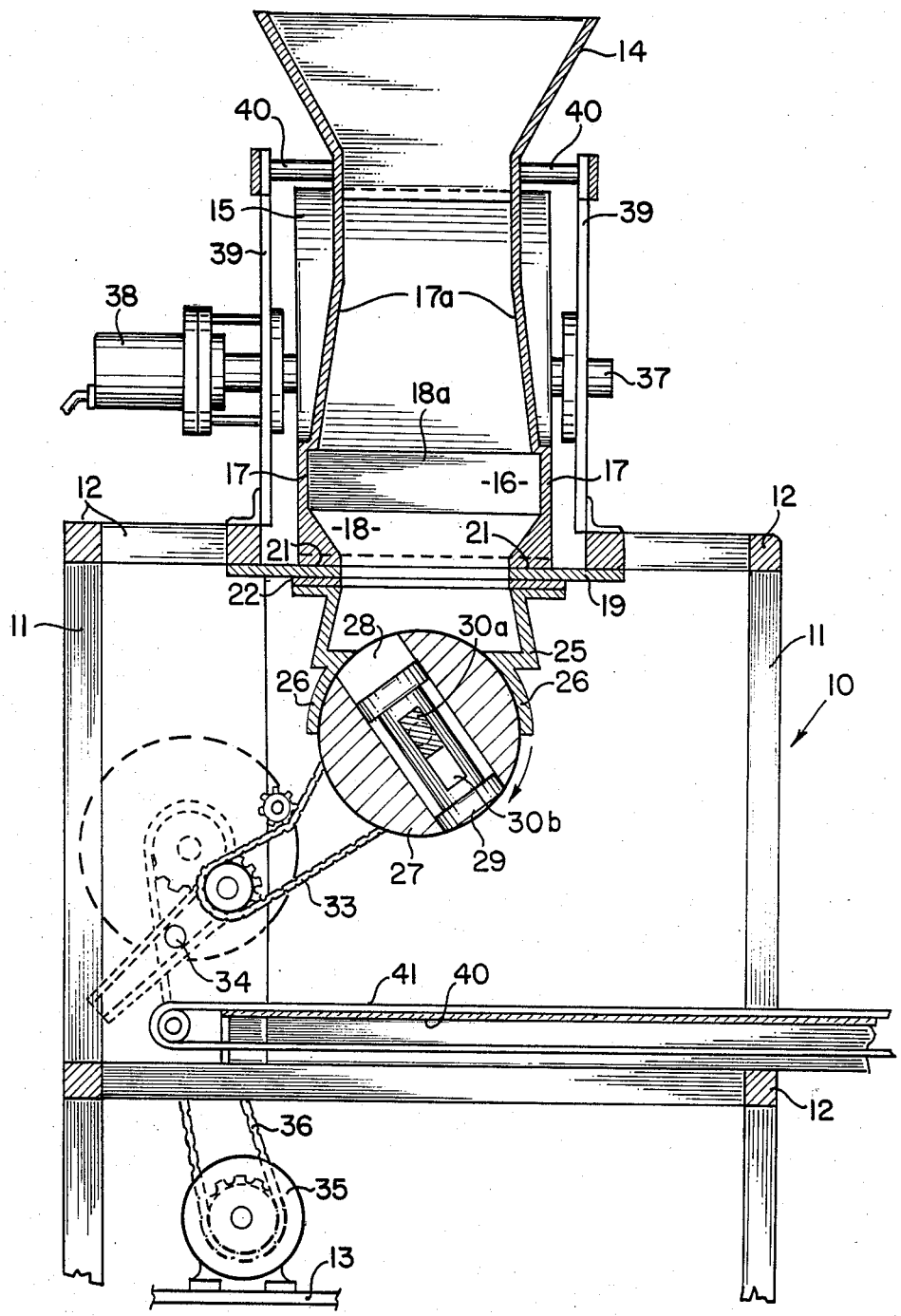
FIG. 2 is a side elevational view taken along line 2—2 of FIG. 1.

With reference to the drawings, the preferred form of dough divider of the present invention consists of a support frame 10 comprising upright frame members 11 and horizontal frame members 12, together with a lower platform 13. A dough hopper 14 is mounted at the top of the frame and above a pair of large plain feed rolls 15 in the form of sheeting rolls which, whilst rotating in the direction shown in FIG. 1, draw dough from the hopper down between themselves and into a short transfer passage 16 defined by a pair of opposed plates 17 following the circumferential surface of the rolls 15 and a pair of side walls 18 the top edges of which, via replaceable scrapers 18a, bear against the circumferential surface of the rolls 15 and are attached to a mounting plate 19 via connecting flanges 20. The plates 17 are also connected at 21 to the mounting plate 19. The mounting plate 19 is in turn attached to the upper horizontal frame members 12.

As the dough passes from the hopper 14 between the feed rolls 15 and increases in pressure it is caused to flow sideways in the direction of the roll axes and would, if not prevented, leak out the side of the rolls. The plates 17 situated at both ends of the rolls, and extended at 17a, slope outwardly away from the axis of the dough flow as the dough proceeds through the rolls. These plates and extensions follow the circumferential surface of the rolls and are machined to have a safe running clearance from the rolls. The slope of the extensions 17a ensures that there is a component of the velocity of the surface of the rolls normal to the interior surface of the extensions. In operation, dough under pressure is forced into the gap 16 between the plates 17 and extensions 17a and the surface of the rolls 15 and the resulting normal component of velocity of the surface acts on this viscous dough forced into the gap and prevents further penetration into the gap and leakage past the plates 17.

It has been found from tests when running the divider that, with an outward slope of 5°–10° for the extensions 17a, dough leakage can be prevented except that in the corner formed by the sloping sides and the transverse scrapers 18a bearing against the drum where a small amount of dough leakage may occur. This leakage is caused by penetration of the order of 4 mm of dough running between the plates 17 and the drum and as this small amount of dough is not intercepted by the transverse scraper and is carried away by attachment to the drum surface and such as to constitute leakage. By increasing the slope of the plate extensions 17a to an angle of 45° or more (up to 90°) at the point of junction with the transverse scraper 18a, this small leakage is effectively eliminated.

The above manner of sealing the dough from end leakage as dough passes through the passage between the rolls and in the pressure chamber immediately after the rolls and before the measuring cylinder, is preferred as, from the point of view of neatness of design and hygiene, it is considered undesirable to have either extensive close fitting metal seals with associated high drag or the wear rates of spring loaded type seals.

The measuring or divider section of the machine is suspended within the frame by means of a connecting plate 22 attached to the mounting plate 19. A housing 25 attached to the connecting plate 22 carries a pair of opposed arcuate scraper walls 26 which bear against the circumferential surface of a rotating cylinder 27 which incorporates a cylindrical measuring chamber 28 extending transversely through the cylinder 27 and within which a free floating piston member 29 is received. The cylinder 27 is in turn supported for rotation on a shaft 30 supported in bearings 31 spaced on either side thereof and suspended, via channel section members 32, from the underside of the connecting plate 22. The shaft 30 is driven by a chain drive 33, which in turn is driven by a mechanical harmonic variator mechanism 34 from an electric motor 35 via a further chain drive 36. As shown the electric motor 35 is mounted on the platform 13 of the main frame. The variator 34 is adapted to allow for a period of reduced rotational speed of the cylinder 27 whilst the measuring chamber 28 is being charged with dough and to allow faster rotation at other times to provide a minimum possible delay between charging of the measuring chamber 28. As example a ratio between high and low speeds of 4:1 may be utilized. As an alternative to the mechanism 34 a Hooke's Joint Coupling may be incorporated into the drive mechanism so as to utilize the cyclical speed variation which may be induced by such couplings.

The feed rolls 15 are each supported on shafts 37 which in turn are each rotatably driven through speed reduction gearboxes by electric motors 38 supplied by variable frequency thyristor controlled inverters as supplied by Danfoss of Denmark under the name VLT. The inverters are arranged to automatically vary the frequency of current supplied to the motors such as to maintain the motor current constant at a pre-set level. In an alternative drive system each roll 15 is driven by a fixed volume hydraulic motor 38 fed from a constant pressure oil supply incorporating a pressure compensated hydraulic pump. The speed of the feed rolls is adjusted by varying the displacement of the hydraulic pump until the feed rate of dough is sufficient to completely fill the measuring chamber. The displacement of the hydraulic pump is automatically varied in response to delivery pressure and to provide preset constant pressure. As the hydraulic motors are of fixed displacement they provide constant torque at the present pressure which in turn provides maximum speed of the feed rolls during transfer of the dough into the measuring chamber 28, and reduced speed at other times. When driven by electric motors 38 controlled in the manner discussed above a drive of similar characteristics to the hydraulic drive is achieved in view of the fact that motor torque is proportional to current. An alternative form of constant dough pressure control may involve the use of a pressure sensitive transducer place in the transfer passage 16 the signal from which may be fed back to the torque control provision in the variable frequency thyristor controlled inverters in the case of the electromechanical drive for the feed rolls 15 and there used to determine the torque control setting to achieve desired dough pressure, or alternatively, fed back to a pressure control device in the oil supply to the hydraulic motors in the case of hydraulic drive.

The shafts 37 are journalled into support plates 39 at either end and which also supports the electric motors 38. The support plates 39 are in turn mounted on adjacent horizontal frame members 12 at their lower ends and the structure is rigidified by connecting rods 40 extending between the plates 39.

The free floating piston 29 is supported within the measuring cylinder 28 by a portion 30a of the shaft which passes through an elongate slot 30b through the piston 29, and the length of which slot determines the length of the stroke of the piston, whilst means may be provided to allow a limited amount of adjustment of its stroke to allow for variation in the weight of dough pieces to be measured or divided. Alternatively weight adjustment may be achieved by replacement of the piston with a piston of different length. As dough is charged into one end of the measuring chamber 28 the piston discharges as previously measured dough piece from the opposite end of the measuring chamber onto the end of an endless conveyor belt 41 the upper run of which is supported on a flat plate 40 and which conveys the measured dough pieces away from the divider.

With the divider of this preferred embodiment of the invention, the relatively large plain feed rolls 15 and plain scrapers 18a serve to carry dough to the measuring cylinder 28 with a minimum of tearing or excessive shearing of the dough compared with disc type rolls or other possible pumping means. Furthermore, the transfer passage 16 in being made as short as possible further minimizes working of the dough as it moves therethrough to the measuring cylinder. In addition, the maximum possible charging time provided by the variator mechanism in the drive for the cylinder 27 allows for the use of relatively slow speeds for the feed rolls 15 further minimizing working of the dough, whilst the short time delay between charging operations minimizes the time that the pressure compensated hydraulic pump is required to rotate the rolls under no flow conditions.

In this preferred embodiment of the divider of the present invention the feed rolls 15 are in the order of 500 mm in diameter and 240 mm long, and has an output of up to 12,000 measured 770 gm dough pieces per hour when run at a mean feed roll speed of 140 rpm, or a lesser number of heavier dough pieces or a greater number of smaller dough pieces. While presently the capacities of associated baking plant limit operation above the above output, the divider has been successfully tested at substantially higher speeds to achieve outputs of up to 18,000 dough pieces per hour whilst still achieve the required dough quality.

We claim:

1. A positive pressure dough divider comprising a dough supply, a pair of rotatable sheeting rolls for creating positive pressure in the dough while carrying the dough from said supply into a transfer passage leading to one or more volumetric measuring chambers, wherein said rolls provide a positive pressure rise along the direction of flow in the transfer passage between the rolls sufficient to charge the measuring chamber or chambers with dough under pressure, and barriers extending between the rolls and adjacent to ends of the rolls for preventing leakage of dough at the ends, the barriers being formed to diverge outwardly toward the ends and with respect to the direction of dough flow between the rolls and to follow the circumferential surfaces of the rolls with a safe running clearance from the rolls.

2. A dough divider as claimed in claim 1, wherein the measuring chamber is provided in a rotating body which is adapted to stop or rotate for periods at reduced speed, such that, while the remaining chamber is being charged with dough from the said rolls, a maximum possible charging time is provided, and to move at greater speeds at other times to provide minimum possible delay between charging operations.

3. A dough divider as claimed in claim 1 further comprising a drive for said rotating body containing said measuring chamber, the drive having a variator mechanism to provide said variation in speeds.

4. A dough divider as claimed in claim 1, wherein said transfer passage provided between the rolls and measuring chamber is relatively short to minimize resistance to flow of dough.

5. A dough divider as caimed in claim 1, wherein dough pressure is detected and roll speed is regulated to achieve a predetermined dough pressure.

6. A dough divider as claimed in claim 5 further comprising a roll drive for driving the rolls, the pressure of dough being controlled by predetermining the torque on the rolls, and the roll drive drives the rolls for increasing roll speed during the charging of the measuring chamber and automatically reduces roll speeds when charging has been achieved and during the time between two charging operations.

7. A dough divider as claimed in claim 1, wherein there is further provided drives for said rolls, said drives being electric motors, and wherein the frequency of current supplied to the motors is automatically varied to maintain the motor current constant at a preset level.

8. A dough divider as claimed in claim 1 further comprising drives for said rolls, said drives being fixed volume hydraulic motors.

9. A dough divider as claimed in claim 1, wherein the barriers diverge outwardly at an angle between 45° and 90° with respect to the direction of dough flow.

* * * * *

UNITED STATES PATENT AND TRADEMARK OFFICE
CERTIFICATE OF CORRECTION

PATENT NO. : 4,573,898
DATED : March 7, 1986
INVENTOR(S) : Jones et al

It is certified that error appears in the above-identified patent and that said Letters Patent is hereby corrected as shown below:

Column 6, line 42, (claim 2, line 4) change "remaining" to --measuring--.

Column 6, line 47, (claim 3, line 1) change "claim 1" to --claim 2--.

Signed and Sealed this

Twenty-eighth Day of October, 1986

[SEAL]

*Attest:*

DONALD J. QUIGG

*Attesting Officer*  *Commissioner of Patents and Trademarks*